US006666765B2

(12) United States Patent
Vancura

(10) Patent No.: US 6,666,765 B2
(45) Date of Patent: Dec. 23, 2003

(54) CASINO GAME AND METHOD HAVING A HINT FEATURE

(75) Inventor: Olaf Vancura, Las Vegas, NV (US)

(73) Assignee: Mikohn Gaming Corporation, Las Vegas, NV (US)

( * ) Notice: Subject to any disclaimer, the term of this patent is extended or adjusted under 35 U.S.C. 154(b) by 147 days.

(21) Appl. No.: 10/057,243

(22) Filed: Jan. 24, 2002

(65) Prior Publication Data

US 2003/0137109 A1 Jul. 24, 2003

(51) Int. Cl.[7] .................................................. A63F 13/00
(52) U.S. Cl. ............................... 463/9; 463/20; 463/13; 273/143 R; 273/138.2; 273/292
(58) Field of Search ............................ 273/143 R, 274, 273/138.1, 138.2, 292; 463/20, 9, 12, 13

(56) References Cited

U.S. PATENT DOCUMENTS 5,401,023 A * 3/1995 Wood ......................... 273/292
6,390,473 B1 * 5/2002 Vancura et al. ............. 273/292
6,394,899 B1 * 5/2002 Walker .......................... 463/9

FOREIGN PATENT DOCUMENTS

| | | | | |
|---|---|---|---|---|
| GB | 2 087 618 A | | 5/1982 | |
| GB | 2 185 612 A | | 7/1987 | |
| GB | 2197974 | * | 6/1988 | ............ 273/143 R |
| GB | 2217500 | * | 10/1989 | ............. 273/138.2 |
| GB | 2 262 642 A | | 6/1993 | |

* cited by examiner

*Primary Examiner*—Benjamin H. Layno
(74) *Attorney, Agent, or Firm*—Dorr, Carson, Sloan & Birney, P.C.

(57) ABSTRACT

During operation of a casino game, a hint feature is displayed with a displayed decision-making game round under control of a processor. A memory may store a plurality of decision-making game rounds. A hint contains response information for a player to increase the player's odds in winning the game round The displaying of the hint feature may occur at a random statistical frequency, based upon player hesitation, or a prevailing position in the game round. The hint is stored with each game round or is dynamically determined for the displayed game round.

32 Claims, 9 Drawing Sheets

CASINO GAME AND METHOD HAVING A HINT FEATURE

BACKGROUND OF THE INVENTION

1. Field of the Invention

The present invention relates to casino games and to casino games having bonusing features.

2. Background

Casino games are popular with the public and over the past decade many varieties of new casino games have been introduced. These new games are implemented in standalone gaming machines, in wide area networks and over the Internet. Casino bonusing games are also increasingly popular when placed in operation with underlying casino games such as, for example, slot machines. Such bonusing games not only attract players but provide additional gaming excitement.

Older, more traditional casino games and casino bonus games simply generate a random or pseudorandom result in a game round such as is found in a slot game. The only input from the player is to place a wager and then spin the reels. Occasionally, the player may be prompted pick an object (within a bonus game) but with no mathematical effect one way or the other. Other casino games and casino bonus games involve decision-making game rounds that receive inputs based on a player's skill, strategy, or even knowledge. In these games a player may receive a higher award based on his/her skill, knowledge and strategy. An example of a skill casino game is video poker.

A problem exists that while some players are very good using skill, knowledge, or strategy, other players are not. A need exists to inform players how to skillfully respond in the decision-making game rounds of such casino games. To do so on every game round, however, as some video poker machines do, is contrary to the very nature of such games. That is, players enjoy playing such games because they can exercise skill, strategy, knowledge and/or personal judgment. Constantly giving players this information would defeat the purpose of the game.

Furthermore, some games, that otherwise might make a good casino offering, are sufficiently complex that a large disparity exists between expert play and average play. To always give hints would again defeat the purpose of the game, but a need exists to provide hints to players either randomly in conjunction with the prevailing position of the game, or otherwise.

In British patent application GB 2 262 642 A, a game machine is disclosed wherein the display screen is used to provide "game hints" which occur transiently as a game proceeds and making suggestions to the player relevant to the actual state of the game. For example, the hint may be to "hold" a particular symbol. This reference briefly sets forth the limited use of hints in a fruit machine casino game. The fruit machine with the game hint feature described above does not improve players' long-term results. Such fruit machines generally use a form of "adaptive logic" wherein coin-in and coin-out is monitored over time and wherein odds/payouts of the fruit machine are proactively adjusted to achieve a target win percentage. Examples of adaptive logic fruit-machines in Great Britain are GB 2 185 612 A and GB 2 087 618 A. Any advantage gained by a player following a hint is to the detriment of future outcomes on the fruit machine. In other words, what the fruit machine "gives" it later "takes away" by altering other parameters of the fruit machine. While adaptive logic fruit machines are permitted in certain foreign jurisdictions such as Great Britain, they are not allowed in the United States. In the United States, the casino game operated with a random number generator must, over all play of the casino game, provide a known player expected return (or house advantage) and the casino game cannot proactively monitor performance and correspondingly adjust play parameters.

Hence, a need exists to fully provide hints, tips, or other such information for strategy and/or skill-based casino games on a random and surprise basis. A further need exists to provide the same, or even provide the correct answer, for knowledge-based casino games in which, for example, the player's knowledge is tested, via trivia, for money. A further need exists to provide such information only when hesitation exists on the part of the player. A need, therefore, exists to provide a hint feature in the underlying casino gaming machine and/or in the casino bonus game to aid the player in the play of a decision-making game round especially when a prevailing position exists. Finally, a need exists to provide within a game for players following hints a long term expected return greater than the long term expected return obtained in play of the casino game without providing the hints.

SUMMARY OF THE INVENTION

The present invention solves the aforesaid problem by providing a hint feature in a casino game such as an underlying gaming machine having a casino bonus game on a random, prevailing position, and/or hesitation basis. A method is set forth for providing a hint with information to the player of a casino game so as to increase the player's expected value and, therefore, to win more at the casino game. During operation of a casino game, a hint feature is displayed during a displayed decision-making game round under control of a processor. If the player follows the information found in the displayed hint, the player's expected instantaneous return from the casino game is increased. The displayed information may be the correct response, eliminating an incorrect response, and/or a response that increases the player's odds in correctly responding. For example, in a knowledge-based game displaying a question with three possible answers, the hint may be the correct answer, eliminating one of the two incorrect answers, and/or information suggesting the correct answer.

The hints provided to players of the casino game of the present invention are true hints that in fact increase the players' instantaneous expected values in play of the casino game as well as overall expected return in play of the casino game.

DETAILED DESCRIPTION OF THE INVENTION

Figure 1A:
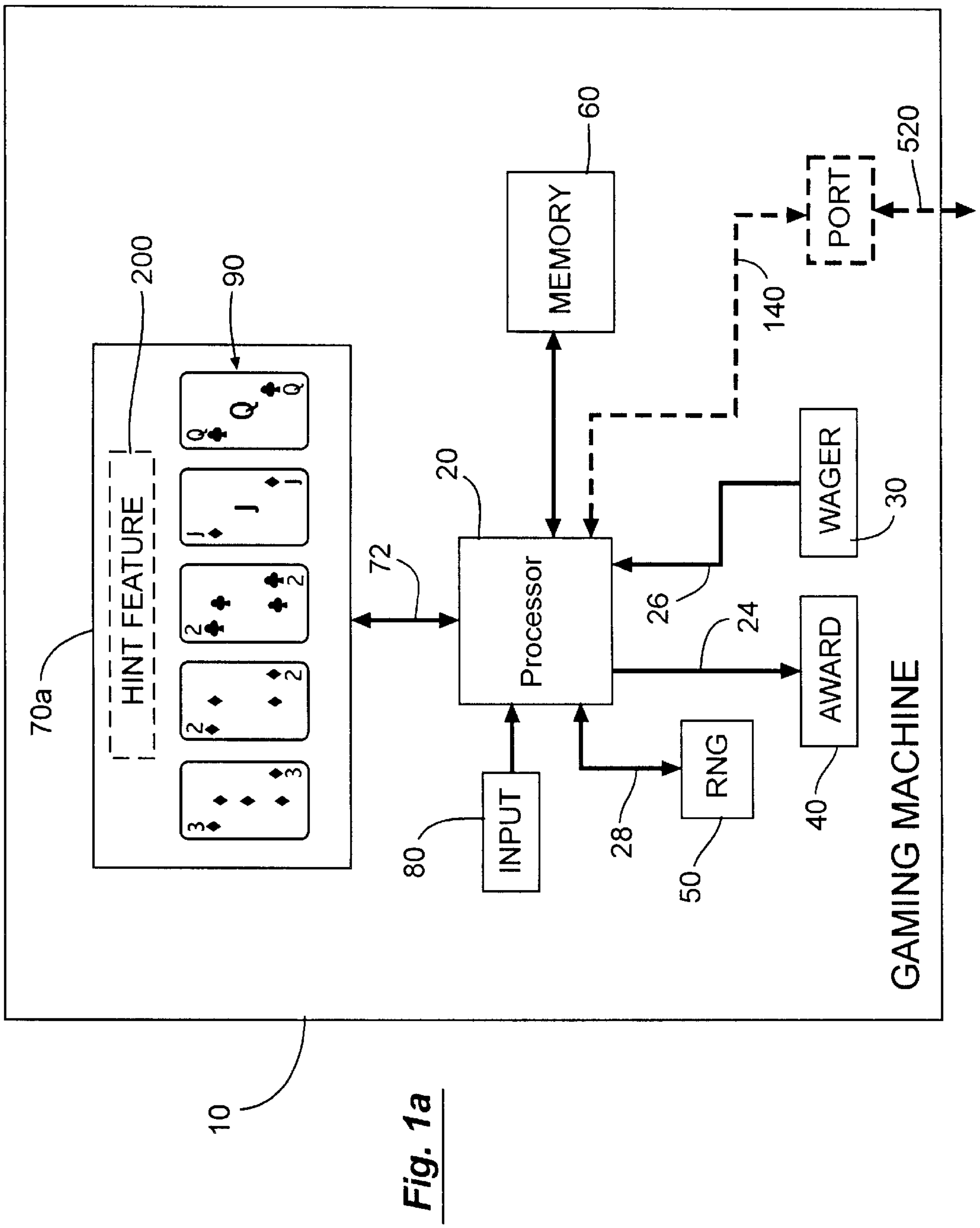
FIG. 1*a* sets forth the hardware configuration of a casino game incorporating the hint feature of the present invention.

1. Overview. In FIG. 1*a* is shown a gaming machine 10 such as a standard video poker gaming machine modified to incorporate the present invention. The video poker gaming machine 10, itself, is conventional and may comprise a number of different designs. The gaming machine 10 can be any casino gaming machine that displays a decision-making game round 90 to a player and then receives the player's input such as, but not limited to, casino card games implemented into gaming machines, for example: Joker Poker, Blackjack, etc. In order to illustrate the various embodiments of the feature of the present invention, standard components are succinctly described in the following as they are well known in the art. Furthermore, the hint feature of the present invention can be implemented in software components over networks such as wide area progressives and over the Internet as subsequently described.

The block diagram hardware components of such a video poker gaming machine 10 as shown in FIG. 1*a* are illustrative only and include a processor, computer or controller 20 interconnected to a device 30 for receiving bets or wagers from players. The device 30 can be of any suitable design or construction and can be for example, but not limited to, a bill reader, coin acceptor, credit device, credit card reader, ticket reader, smart card reader, debit card reader, or any combination thereof. How a wager is received in device 30 is immaterial to the teachings of the present invention. The processor 20 is also connected to an award 40 which can be for example, but not limited to, a display showing current available player credits and the associated separate devices for delivering payouts to the player such as: a coin or ticket dispenser, a device for delivering payout information to a smart card; etc. How an award is made to the player is also immaterial to the present invention. Furthermore, the award can be any type of an award, such as but not limited to: a monetary value, a free game play, a comp, a physical item such as a car, etc.

The processor 20 is usually connected to a random number generator (RNG) 50 which may be a separate hardware component or a software module within memory 60. The RNG 50 is any random or pseudorandom number generator conventionally used in gaming machines. The processor 20 is interconnected to memory 60 and to display 70*a*. Gaming machine 10 is shown in functional block diagrams and conventional clocks, ports, busses, buffers, hoppers, hopper controllers etc. are not shown.

The hint feature 200 of the present invention is independent of the type of casino gaming machine and can be implemented in any suitable casino game. In FIG. 1*a*, a video card game is shown to illustrate the present invention. It is to be expressly understood that the casino gaming machine 10 is any casino game having decision-making game rounds.

Figure 1B:
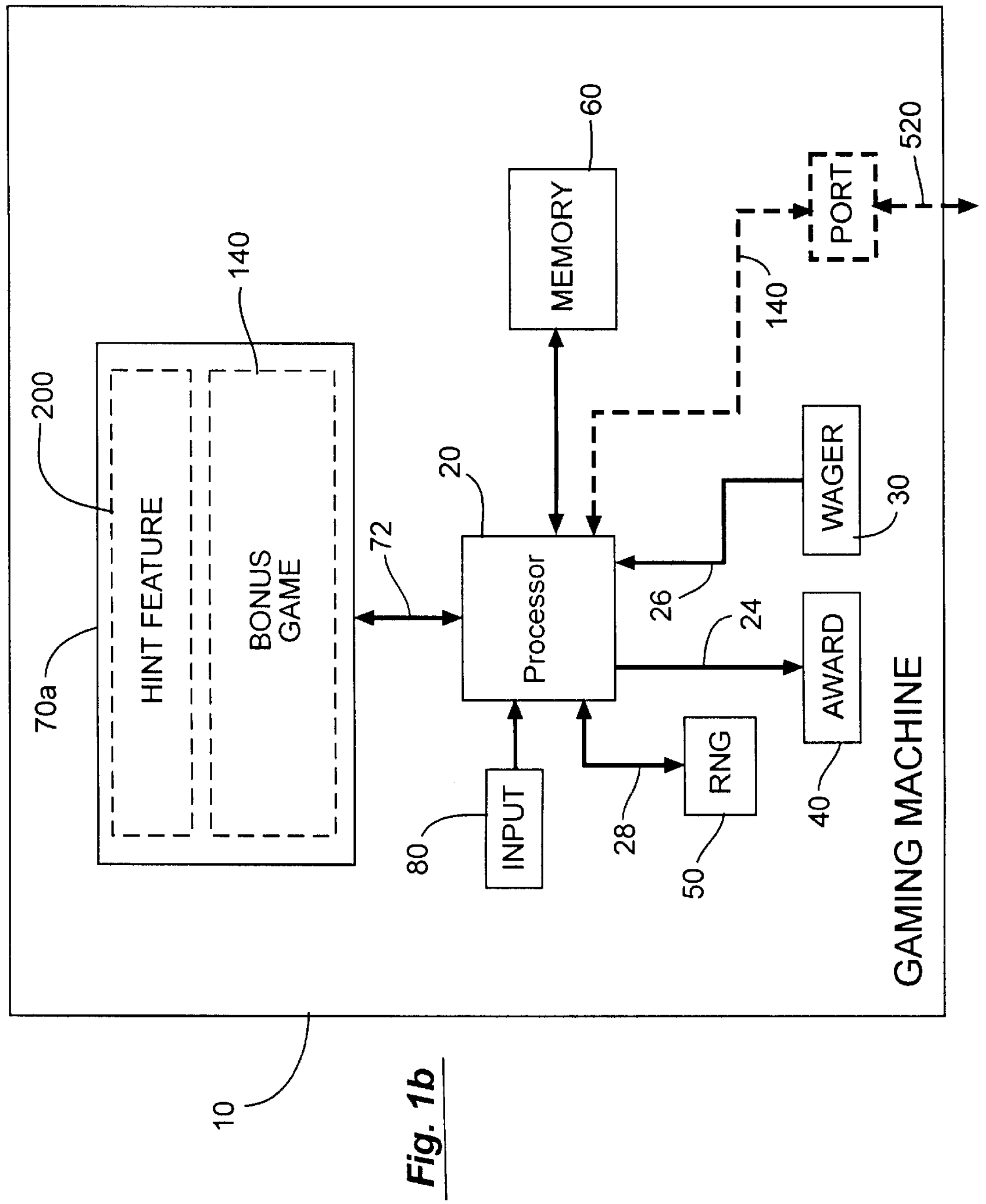
FIG. 1*b* sets an underlying casino gaming machine having a casino bonus game incorporating the hint feature of the present invention into a separate screen.

While FIG. 1*a* illustrates the hint feature 200 being displayed during play of a card game, it is to be expressly understood that the hint feature 200, as shown in FIG. 1*b*, can also be used with a bonus game 140 having decision-making game rounds which is displayed in the same CRT or display 70*a* as a separate display screen. Hence, in FIG. 1*a*, the hint feature is used during play of the casino game in the underlying gaming machine and FIG. 1*b* illustrates the use of the hint feature during the play of the bonus game which occurs as a separate screen in the same display. It is to be expressly understood that several variations of the present invention exist. The hint feature 200 could be used exclusively in play of the underlying gaming machine, exclusively in play of the bonus game 140 or in a combination of both. As for example but not limited to, a conventional underlying slot gaming machine (having no decision-making game rounds) with a casino bonus game (having decision-making game rounds with the hint feature). Or, a conventional video poker gaming machine (having decision-making game rounds with no hint feature) with a casino bonus game (having decision-making game rounds with hint feature). Or, a conventional video poker gaming machine (having decision-making rounds with hint feature) and a casino bonus game (with no decision-making game rounds).

Figure 2:
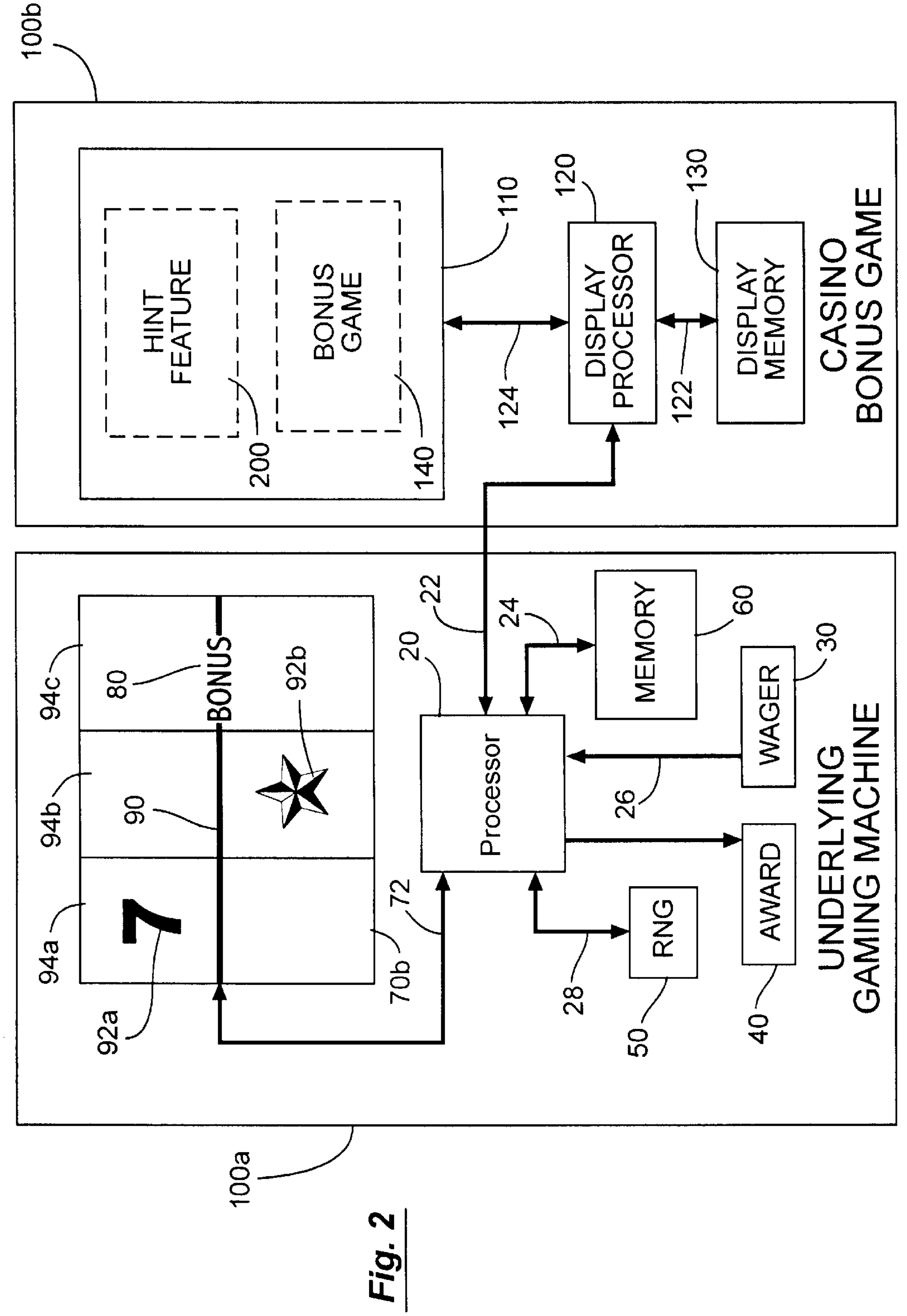
FIG. 2 sets forth the hardware configuration of an underlying casino gaming machine having a casino bonus game incorporating the hint feature of the present invention into a separate display.

The hint feature 200 is further shown in FIG. 2 with a conventional underlying gaming machine 100*a* having a casino bonus game 100*b* in a separate display 110. The underlying gaming machine 100*a* is shown to be a slot machine. In FIG. 2, symbols 92 are shown which are also conventional in play of conventional slot machines. Three reels 94*a*, 94*b*, and 94*c* are illustrated showing symbols 92*a* and 92*b*. Any number of reels 94 could be utilized and any number of symbols 92 can also be utilized. While one payline 90 is shown, it is to be expressly understood that conventional slot machines have a plurality of paylines and such paylines need not be linear but could, for example, zigzag over the face of the reels in various combinations. Such slot game rounds have non-decision-making game rounds.

In FIG. 2, the processor 20 is further interconnected over a two-way bus 22 to a display processor 120. Display processor 120 is interconnected over a two-way communication channel 124 with a display 110 and is also interconnected over a memory bus 122 with a display memory 130. It is to be expressly understood that in some designs for the hardware of the present invention, the processor 20 can drive over 22 the display 110 without using separate display processor 20 and display memory 130. For example in FIG. 1*a*, the processor operates the video poker game for a player in display 110.

In FIG. 2, the conventional slot machine 100*a* has a bonus condition such as, for example, the bonus symbol 80 on payline 90. The provision of a bonus symbol(s) 80 on the payline 90 is also conventional and it is well known that slot machines 10 can have a bonus condition (whether or not on the payline) randomly appear which results in a player having the opportunity to play a bonus game. In FIG. 2, the processor 20 over line 22 delivers the bonus condition to the casino bonus game 100*b*. When a player receives the bonus condition 80 on the payline 90, which may be any suitable bonus condition, the player's attention is then directed to the casino bonus game 100 having decision making game rounds.

The bonus condition can be any suitable bonus condition and is not limited to a bonus symbol 80 appearing on the payline 90. Whatever causes a bonus condition to occur in the play of the underlying game 100*a* results in play of the casino bonus game 100*b*. When the player plays the bonus game 140 in display 110, the hint feature 200 of the present invention, in one embodiment, randomly appears. It is important to note that any type of casino bonus game 100*b* including strategy-based casino bonus games, knowledge-based bonus games or skill-based bonus games, indeed any game in which the player's choices or decisions mathematically affect the expected value of the game round (i.e., decision-making game round), could all be utilized with the hint feature 200 of the present invention.

In many conventional slot games with a bonus game, the same CRT is used for both games. Hence, the bonus game 140 with hint feature can be implemented in the display 70*b* as a second screen or discussed above for FIGS. 1*a* and 1*b*. This eliminates the use of a separate display processor 120 and display memory 130. In other words, the bonus game 140 is displayed as a second screen in the embodiment of FIG. 1*b*.

The hint feature 200 of the present invention is shown in FIGS. 1 and 2. The hint feature 200 of the present invention, as will be explained in the following, and in one embodiment randomly appears without warning to the player and creates interest and excitement for the player. While the above embodiment provides for a "random" hint, in another variation the hint 200 is based upon player hesitation. For example, if the decision-making game round is displayed and the player does not respond in a set time frame, a hint 200 is displayed. In another variation, the hint is displayed when a prevailing position in the game round is displayed. For example, in a game such as blackjack, the player's current total in his/her hand coupled with the dealer's upcard may comprise the prevailing position. In a "Battleship" type of casino game, the prevailing position may comprise the number of shots taken as well as the locations of any "hits" and "misses." In general, the processor determines the prevailing position by taking into account all relevant factors affecting the proper decision in a casino game with multiple possible positions and decisions. A combination of the above can also be used. As an illustration, when hesitation occurs (i.e., a set time frame expires as determined by the processor) or a prevailing position occurs as determined by the processor a hint is randomly displayed.

The term "casino game" is defined herein to be any gaming machine or underlying gaming machine having a bonus game implemented with a computer-based control such as processor 20 in FIGS. 1 and 2. As will be pointed out later, the casino game can be part of a wide area progressive or played over the Internet or other online environment. Such casino games are regulated in the responsible jurisdiction such as in the United States by suitable gaming regulations insuring fairness to players and casinos at a given long term players' expected return (or house advantage from the viewpoint of the casino) over all play of the casino game based on the output of a random number generator. One type of player of particular interest is he/she who does not employ any strategy. This given long term players' expected return is determined with the player guessing at each decision-making round. For example, if in a conventional casino game the house advantage is 8%, the long term players' expected return is 92%. The term "decision-making" game round is defined herein to mean a game round wherein the player has a choice among possible inputs with at least one of the possible inputs increasing the instantaneous expected value for the player in the play of the game round for the casino game. The term "hint" in one embodiment of the present invention is defined herein to contain information for the player to increase the instantaneous expected value for the game round so that the player chooses properly or more properly from the possible inputs. Of course, a knowledgeable player or a skilled player would not benefit from the hint as they already know the input to select. The hint feature of the present invention, however, can be used on all casino games in which the player has a choice, whether mathematically (with no hints), the player's choices make a difference (i.e., decision-making game) or not (non-skill game).

Figure 3:
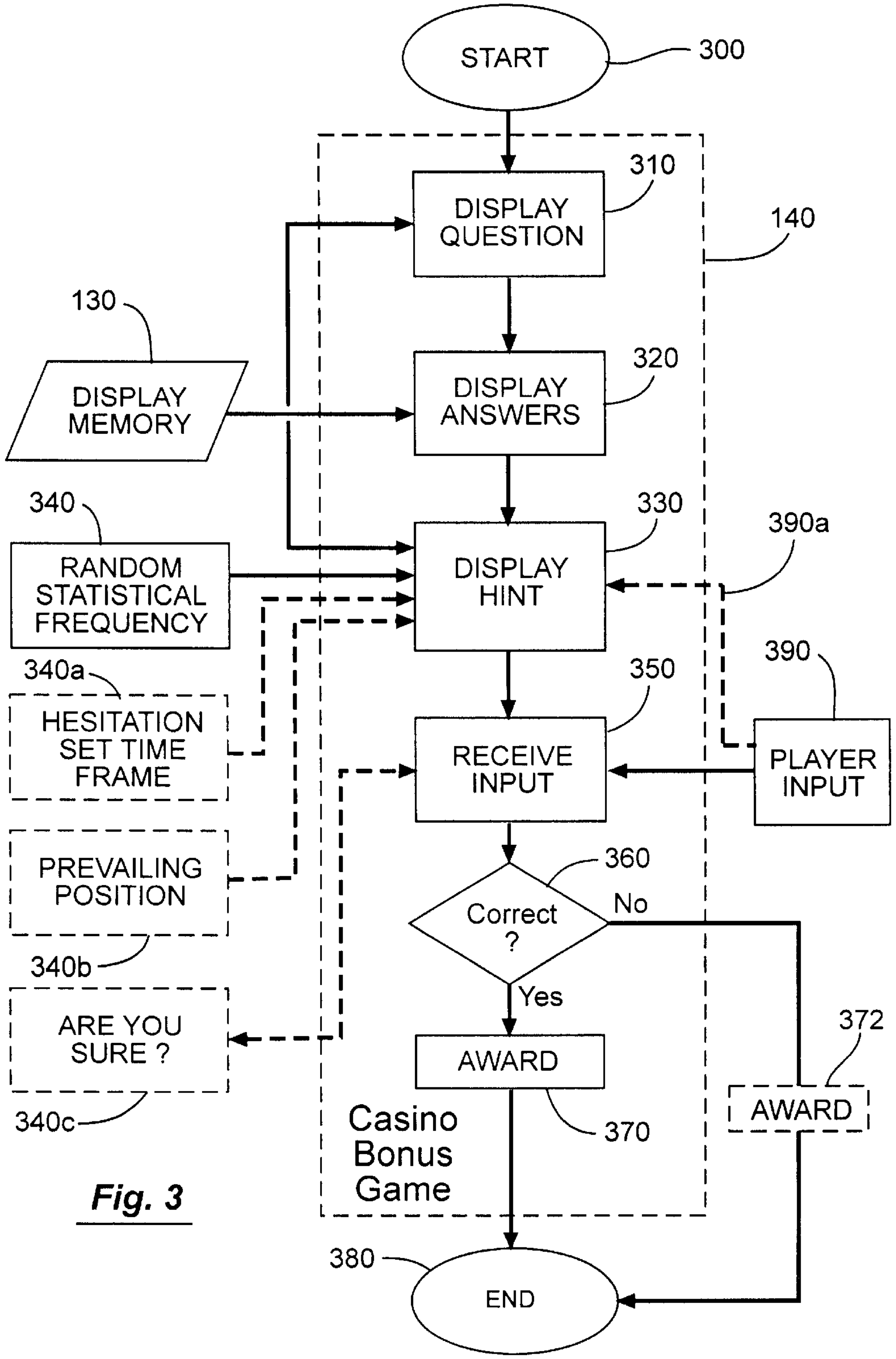
FIG. 3 sets forth several embodiments of the method of the present invention showing the various method steps for implementing the hint feature into the present invention for a casino game.

2. Method. A method for implementing the hint feature 200 of the present invention is illustrated, in one example, in FIG. 3 and can be implemented in suitable software in the gaming machine 10 of FIG. 1 or in the underlying gaming machine 100*a* and the casino bonus game 100*b* of FIG. 2. With respect to FIG. 2, when the bonus game 140 is entered upon the occurrence of a condition such as a bonus symbol 80 appearing on payline 90, the processor 20 over bus 22 causes the display processor 120 to start 300. The bonus game 140 is then displayed in display 110 (or the same display 70*a* as a separate screen as shown in FIG. 1*b*).

The example of a knowledge-based casino bonus game 140 is used in the following. The processor 20 based upon obtaining a random number from the random number generator 50 over lines 28 delivers the random number over bus 22 to the display processor 120. The display processor 120 over lines 122 uses the random number to address a stored question, having a plurality of answers in memory 310 for display in display 110. The question is displayed 310 along with the plurality of answers 320 as a bonus decision-making game round for the player to respond to. For example, a question with three answers, the three answers are three possible inputs that the player can respond to.

Whether or not the hint is displayed 330, for the case of randomly displaying the hint, is determined at a random statistical frequency 340. If, for example, the overall random statistical frequency is ten percent, then through all play of the bonus game 140 statistically, the hint is randomly displayed 330 ten percent of the time. Of course, from the viewpoint of the player, the display of the hint suddenly appears randomly. Again, this random statistical frequency 340 is based upon the output of the random number generator 50 and is determined by the processor 20 in software for delivering an activation signal over bus 22 to the display processor 120. When the display processor 120 is suitably activated, it will also display the hint 330 in the display 110 in the casino bonus game 140. The displayed hint increases the player's odds in winning the displayed game round (i.e. increases the player's instantaneous expected value for the decision-making game round). The player then inputs 390 an answer from the possible answers which is received 350 in the casino game 140 according to the method of the present invention. If the answer is correct 360 (or more correct), an award 370 is given and, if the answer is incorrect, the casino bonus game 140 ends 380.

In another embodiment, the hint 200 is displayed when a set time frame 340*a* (such as 5 seconds) expires, as determined by the processor, after the decision-making game round is displayed. Or, in yet another embodiment, the hint 200 is displayed when a prevailing position 340*b*, as determined by the processor, in the decision-making game round is displayed, as determined by the processor.

In yet another embodiment, if the player actually inputs 390 a response, the hint of the present invention appears under control of the processor and, for example, states: "Are you sure?" 340*c*. The player is then allowed to provide another input 390. In this example, if the difference in expected value (EV) is large between the initially selected answer and the correct answer, then the "Are you sure?"

pops up because the player is making an error that is very costly. This embodiment can be used with stage 330 wherein a hint is displayed first or, with the stage 330 occuring after the player inputs 390 the wrong input. Here, the "Are you sure?" feature can be displayed based on the random statistical feature 340 or the prevailing position 340*b*.

Another variation to the hint feature of the present invention is based on asking for advice. For example: "ask a friend" for knowledge-based games. It would function as follows: Three "friends" graphically appear on screen (i.e. displaying a choice of hints to be selected by the player) of the casino game in stage 330 under control of the processor. The player chooses one 390*a*, and the "friend" then visually and/or states the hint 200: "I'm X % sure the answer is Y". The algorithm starts audibly with the known answer (e.g., B) of two possible answers to a knowledge-based question, and with a desired degree of certainty (e.g., 80%). The microprocessor randomly choose a number from 1 to 100. If the number is 80 or less (e.g., an 80% chance), then the "friend" says "I'm 80% sure the right answer is B." If the number is 81 or more (e.g., a 20% chance), the the "friend" says "I'm 80% sure the right answer is A." In this example, the "friend" is expected to be right 80% of the time, and in fact the friend would be. What is interesting in this embodiment is that this is a "hint" in the sense that it provides information to the player. However, the information may not be strictly correct. In the example above, if the "friend" is 80% sure, then obviously a player that doesn't know with certainty that he/she should should adopt the "friend's" answer, because it could be wrong. The term "hint" in this embodiment is defined to contain information for the player that, in principle, increases the expected value for the game round so that statistically (i.e. a percentage odds) the player chooses properly or more properly from the possible inputs. In this embodiment, the player interacts 390*a* with the displayed hint 330.

Figure 4:
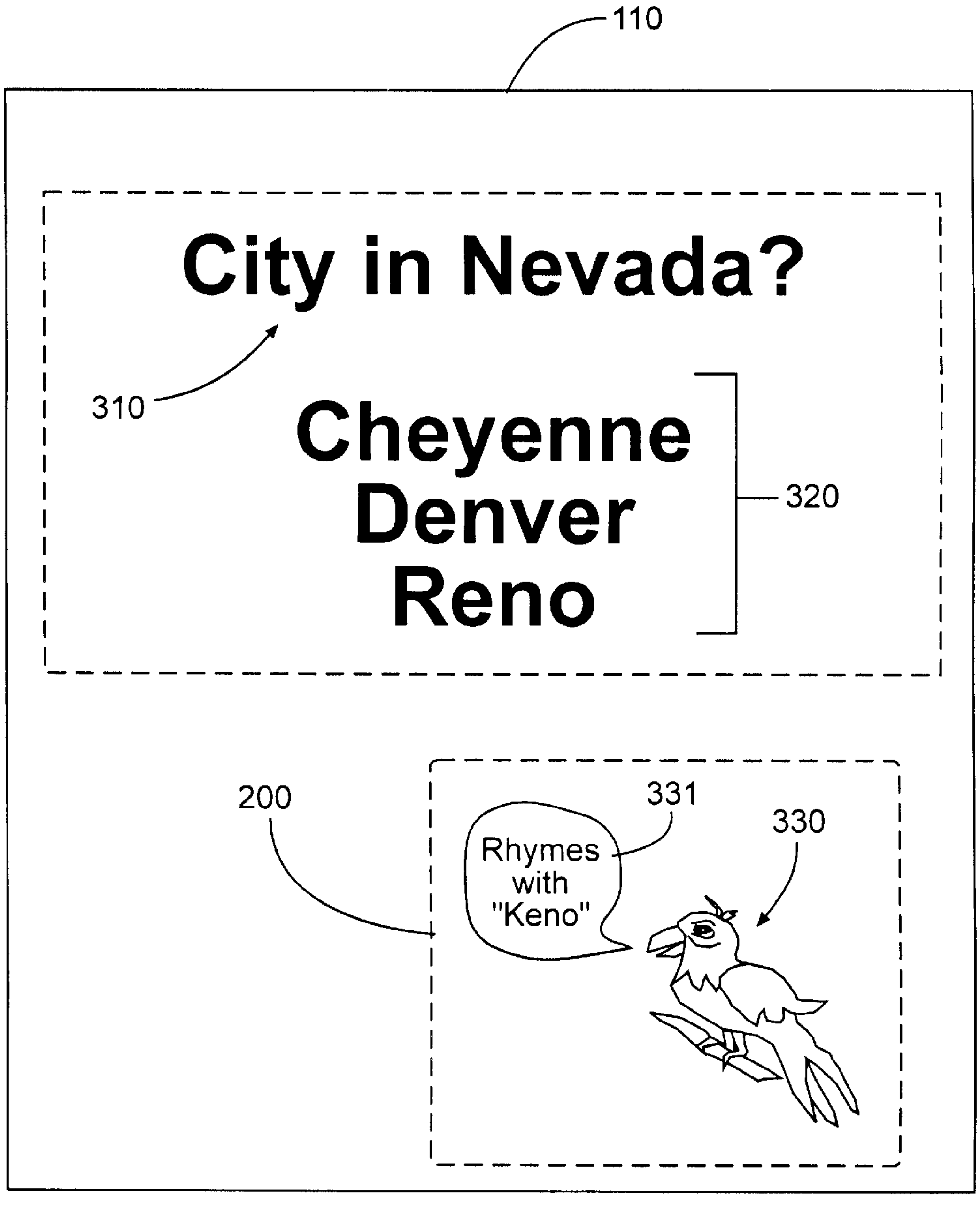
FIG. 4 is an illustration of the hint feature for the method of FIG. 3.

In the example of FIG. 4, the question 310 displayed in a knowledge-based decision-making game round has a plurality of answers 320. The player may or may not know the answer to the question. The hidden hint feature 200, in the case of this example, is displayed 330. Based upon the information 331 contained in the hint 200, the player is better able to pick the correct answer from the possible inputs (if the player doesn't know the correct answer). Hence, the display 330 of the hint 200 enables the player to input 390 one of three possible inputs which is received 350 in the bonus game 140, such as by touching the correct answer 360 on a touch screen, so as to obtain an award 370. If incorrect, the player may still receive, in one variation, a lower award 372.

The display 330 of the hint 200 can occur simultaneously with the display of the answers 320 (i.e., possible inputs) or after the display. In the case of the hint feature 200 being displayed 330 after the answers are displayed 320, it may be that the player has already input 390 (because the player knows the answer) and which input has already been received 350 by the casino bonus game 140. In which case, the processor 20 (and/or control of the display processor 120) would prevent the hint 200 from being displayed 330. Indeed, in one variation of the present invention, a predetermined hesitation time 340*a* such as two to five seconds after display of the question 310 and the answers 320 is used in the processor in stage 340*a*. Only then would the hint 330 be displayed. It appears to the player than the casino bonus game 140 anticipates that the player does not know the answer to the question and then provides a hint. In one variation, the system determines whether the random statistical frequency authorizes display 330 of the hint 200 and whether it should be displayed is based upon the lack of receiving a player input 350 before the predetermined time frame lapses (i.e. hesitation). The order of determination is immaterial.

The information 331 contained in the hint 200 can be quite blunt and the odds of the player, when following the information 331 in the hint 200 increases from 33% (guessing), in winning to 100%. For example, in FIG. 4, the parrot 330 could state:

The answer is "Reno"!

Or it could be vague such as the following information 331 which increases the player's odds of winning from 33% (guessing) to 50% (guessing):

It's one of the last two choices!

or

It's not the first answer!

This latter example eliminates Cheyenne. In any event, the purpose of the hint 200 is to increase the player's instantaneous expected value (EV) in the decision-making game round for the casino game over simply guessing.

Consider a casino bonus game with questions 310 having two possible answers 320, for each of which the right answer is awarded 50 credits in stage 370, and a wrong answer is awarded 20 credits in stage 372. Players knowing none of the answers (i.e., guessing at all of them) have a long term (i.e. over all play of the casino game) expected value of $EV=\frac{1}{2}\times 50+\frac{1}{2}\times 20=35$ credits. A player of one bonus game round has an instantaneous expected value of 50 credits or 35 credits. The instantaneous difference between the player knowing the answer and the player not knowing the answer is thus 15 credits. An advantage of the current invention is that this difference may be adjusted to a desired level over all play of the casino game through the use of hints 200. For example, if hints 200 showing the right answer are given randomly 340 with frequency 10%, then the player knowing nothing (i.e. guessing) has long term effective expected $value=0.55\times 50+0.45\times 20=36.5$, with the difference now being only 13.5 credits over all play of the casino bonus game. That is, when the player follows the information in the hint.

Or consider a bonus game round comprising a question 310 having three possible answers 320 for which, on average, a right answer 370 is awarded 100 credits and a wrong answer 372 is awarded 70 credits. A player knowing the correct answer has an expected value of 100 credits. A player knowing none of the answers (guessing at all of them) has an expected value $EV=\frac{1}{3}\times 100+\frac{2}{3}\times 70=80$ credits. The difference between these two types of players is thus 20 credits. However, randomly 340 giving a hint 50% of the time that eliminates a wrong answer brings up the expected value of the player who guesses to $EV=0.5\times(\frac{1}{2}\times 100+\frac{1}{2}\times 70)+0.5\times(\frac{1}{3}\times 100+\frac{2}{3}\times 70)=82.5$ credits provided the player follows the information in the hint.

While these are specific examples for knowledge-based bonus games, what is important is that the difference in expected return can be brought to a desired level through appropriate design of the mathematical value of the game, types of hints, and hint frequencies. The term "expected return (ER)" is used for the overall casino game and the term "expected value" is used, in this example, for the casino bonus game itself. For example, a conventional underlying casino game having a long term expected return (ER) of 65% with a bonus casino game having a long term expected value of 25 units at a random frequency of 1%, then the longterm expected return for the underlying game with the bonus game is ER=65%+25%=90% (house advantage is 10%).

The above examples is based upon a knowledge-based bonus game. The teachings of the present invention are not limited to knowledge-based bonus games and, hence, could be given in strategy-based bonus games and skill-based bonus games. The term "guessing" is used herein for selection of the possible player inputs for decision-making rounds not only in the above discussed knowledge-based games, but also in strategy- and skill-based casino games as explained next.

Figure 5:
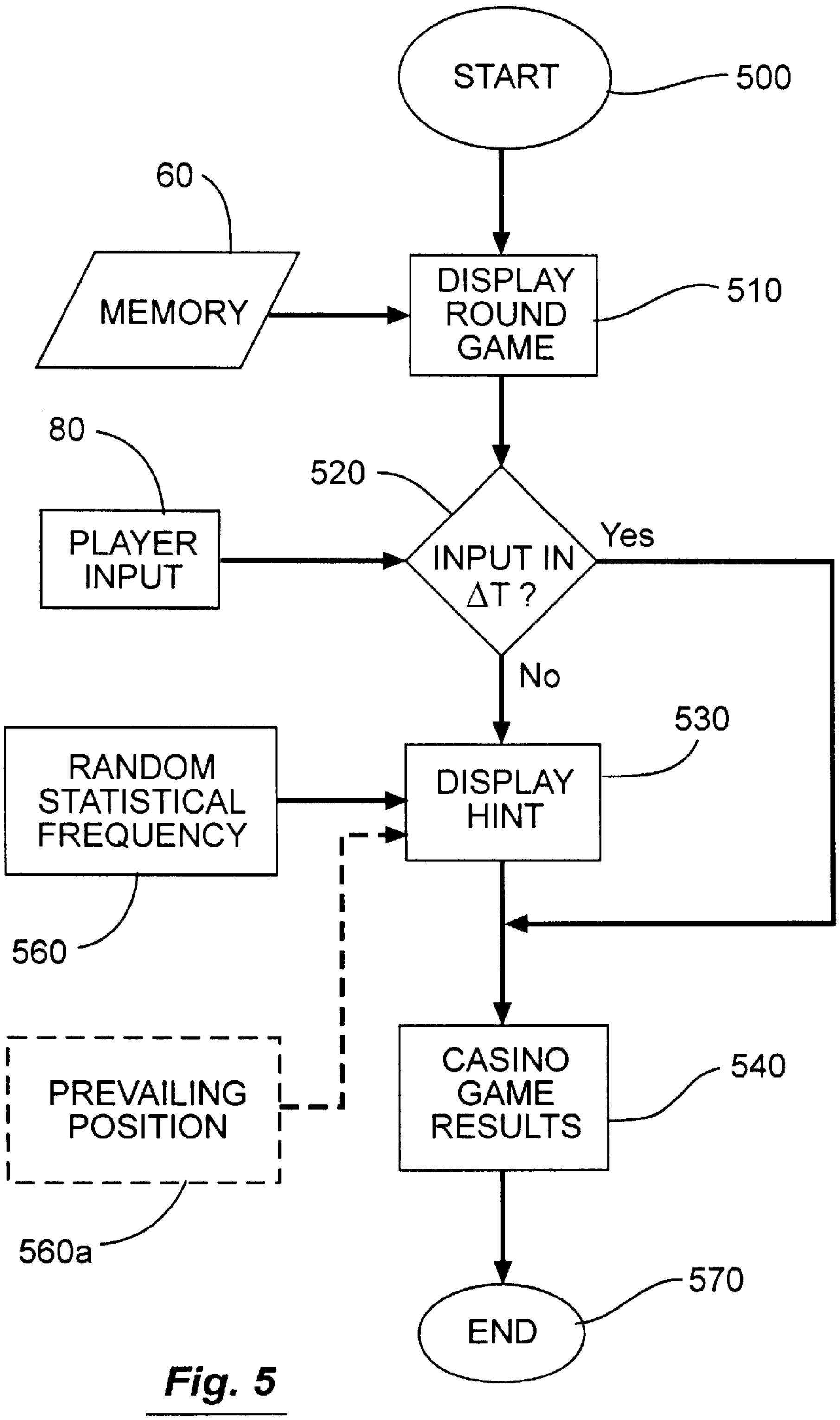
FIG. 5 sets forth another embodiment of the method of the present invention.

In the example for FIG. 1*a*, one embodiment of the method of the present invention is set forth in FIG. 5. In FIG. 5, the method starts 500 after a player has entered a suitable wager already into the gaming machine 10. The processor 20 using the random number generator 50 to randomly select, in the case of the video poker, a single decision-making game round dealt in the card game or "hand" 90 as shown in FIG. 1. The hand 90 as a sequence of cards randomly selected in conventional fashion from memory 60 for displaying 510 in the display 70*a*. The player then responds to the displayed decision-making game round or, in this example, the displayed hand. In this variation of the method of the present invention, in stage 520, the gaming machine 10 determines whether or not a player input 80 has been received 540. If a player input has been received 540 during the predetermined time frame, ΔT, such as two to five seconds after display of the game round, then the hidden hint feature 200 of the present invention is not displayed 530 in the display 70*a* and the game round conventionally completes 540. If there is hesitation by the player to deliver an input 30 so that the predetermined time period has expired in stage 520, then the hint 200 is displayed 530, but only if it is authorized 560 at the random statistical frequency. Hence, if the player waits too long in stage 520 and enters stage 530, the hint 200 is not displayed unless authorized at the random statistical frequency 560 under control of the processor. The hint 200 is displayed 530 which should influence the player to provide the correct input 30 to finish the casino game 540 thereby increasing the expected value. The order of stages 520 and 530 is immaterial. After the results of the game 540 are determined, the game ends 570. The player input 80 is at least one input. For example, in video poker, the player can provide up to five possible inputs corresponding to a "HOLD" for each of five cards.

Figure 6:
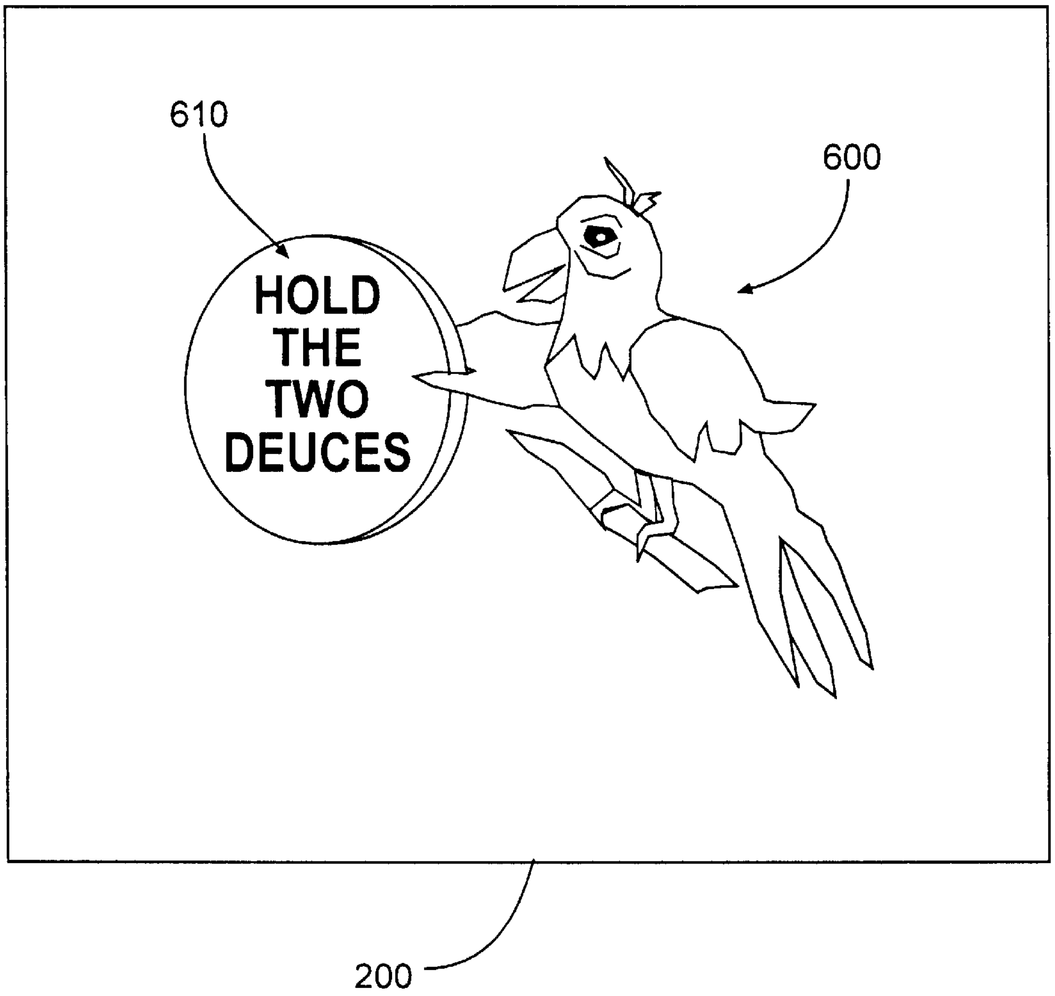
FIG. 6 is an illustration of a hint for the method of FIG. 5.

Consider the following examples. In blackjack, a given position (e.g., player holds 12 and dealer holds 10 and an upcard) provides several strategic alternatives to the player. In principle, a calculable expected value (EV) is associated with each of these alternatives. So, the hint that is displayed may be a function of the prevailing position 340 in the game as determined by the processor in stage 560*a*. For example, a common position is a player holding 16 vs. a dealer holding 10 with an upcard. Here, the difference between Hitting and Standing is minimal (~1%) in terms of EV. However, the difference between Hitting and Standing is more substantial with, say, a player holding 12 vs. a dealer holding 10 with an upcard, and so this invention may be utilized to make hints more frequent when a given position has a larger disparity between perfect strategy and weak strategy. Likewise, this invention can be utilized to give hints only, or always, when the disparity is greater than a certain differential EV. In this manner, the player may be helped along for the "difficult" decisions in a game. This serves to, as alluded to earlier, potentially mitigate the difference between a "perfect" player and an "average" player, if desired. In FIG. 6, an example of a display 600 for a hint 200 containing information 610 for holding the two deuces in the example shown in FIG. 1*a* is shown. In principle, following this hint 200 increases the EV for the player vs. random play (i.e., guessing).

An example of a non-decision-based casino game using the present invention to turn into a decision-based casino game follows. A player enters a bonus round and is given a choice of choosing one of five colored shields on the display screen. Five random awards (20, 40, 60, 80, 100 units) are randomly hidden behind the shields, one per shield. The player touches the desired shield. An arrow then flies in to pierce the shield, which crumbles to reveal the award the player has won. As described, this is a game with player input (the choice of the shield to touch) but not a decision-making casino game. The reason it is not a decision-based casino game is that, mathematically, it makes no difference which shield the player touches. As described, over all play the player has the same expected value of ⅕×20+⅕×40+⅕×60+⅕×80+⅕×100=60. If as part of the game, a hint 200 randomly appears such as "Don't choose the shield on the far right!" or "The shield with the highest award is red!" or "The shield with the lowest award is striped!", etc., the player's choice now does matter. Mathematically, the player's expected value after the hint is now a function of which shield is chosen. Hence, the game has been converted to a decision-based game wherein specific choices on the part of the player are mathematically preferred over other choices.

Two approaches exist for providing the hint 200 of the present invention. The first is a static or stored approach and the second is a dynamic or calculated approach.

Figure 7:
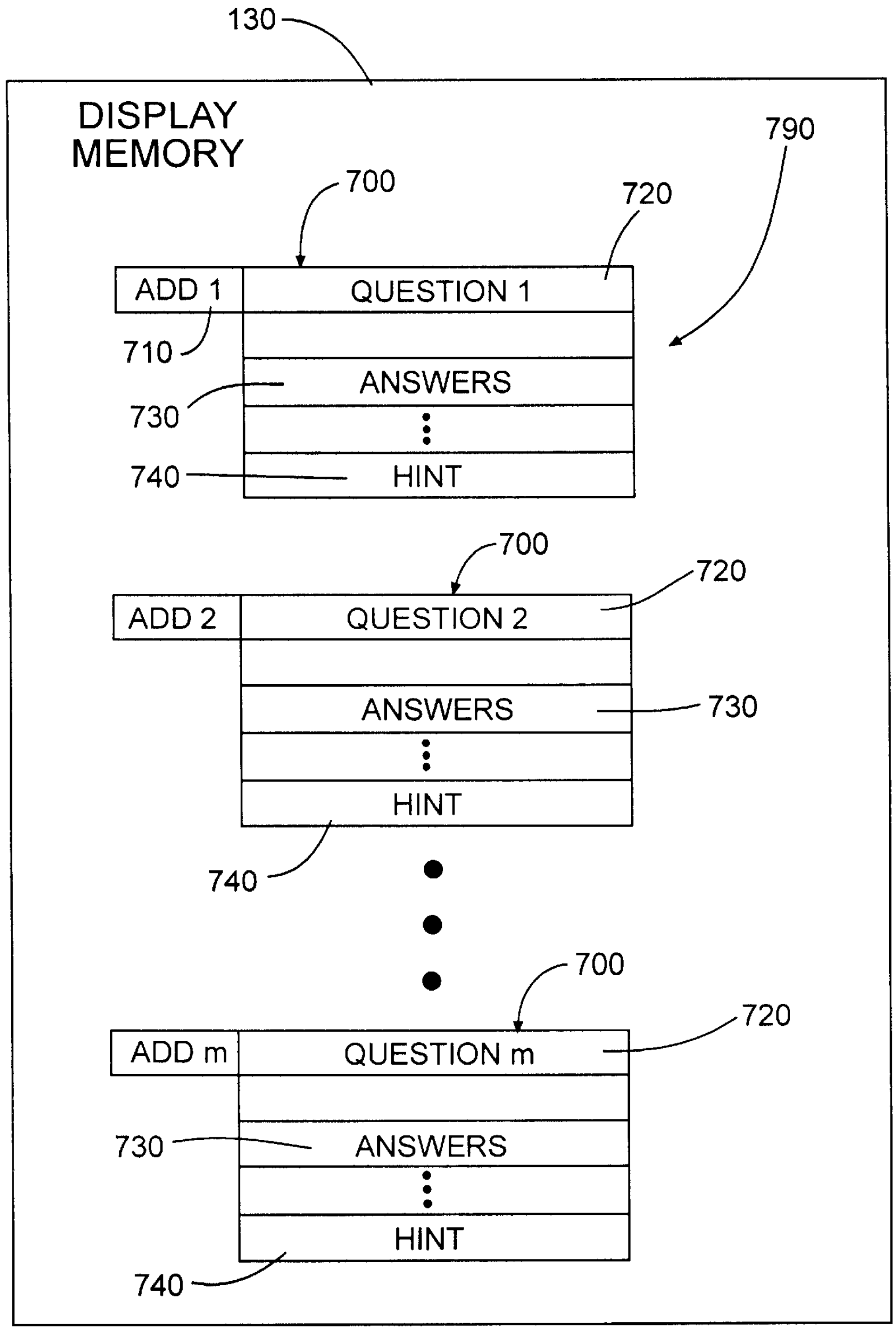
FIG. 7 sets forth programs in memory during for implementing various random hints of the present invention.

In FIG. 7, the static or stored approach is illustrated. Here, the display memory 130 for the examples of FIGS. 2 and 3 has memory files for the knowledge-based questions. For example, data file 700 has an address 710 for the display processor 120 based on the random number, as previously discussed, to access. Each data file 700 has a question 720, answers 730, and a hint 740 for a displayed bonus game round for the player to respond to. Previously discussed with respect to FIG. 3, the question 720 and the answers 730 are displayed as shown in FIG. 4 in stages 310 and 320 which could occur simultaneously or the question is displayed followed by the answers. Whether or not the hint 200 is displayed from the storage location 740, is dependent upon whether or not it is authorized based upon the determination of the random statistical frequency 340. If it is, then the hint is displayed 330 in display 110. Of course, the hint 740 is different for each different data field 700 (i.e., for each different question). Furthermore, the hint 200 can be displayed simultaneously with the question 310 and the answers 320 or, as previously discussed, a predetermined time frame thereafter. In a variation on this, when the display memory is designed hint 740 can be randomly dispersed throughout the database to achieve the random display of hints.

In FIGS. 4 and 6, the stored hints are "Rhymes with "keno"" and "Hold the two Deuces." The parrot graphics are separate display modules that do not need to stored with each data file. In variations of the present invention different graphics could be used to add variety.

While FIG. 7 illustrates the display memory 130 for a knowledge-based bonus game, it is expressly understood that a hint could be provided whatever the nature of the decision-making game round for the casino bonus game 100*b* is.

In the gaming machine 10 example of FIGS. 1*a* and 5, the data field 700 for a given game round exists in the memory 60 and the displayed card hand 90 which appears dealt to the player occupies field 720. In this example, there would be no field 730 but there would be a hint 200 in field 740. Hence, associated with the card hand 90 shown in FIG. 1, would be the hint 200 in FIGS. 1 and 6.

In the second approach of the present invention, the stored hint 740 is not used. Under this approach, and with reference to FIG. 3 and step 330, when the random hint is to be displayed, it simply displays the correct answer. Hence, the graphic parrot in FIG. 4 would simply display the correct answer. This occurs dynamically when the hint 330 is displayed randomly. In this embodiment, a separate data field 740 is not required. Dynamic determination of the hint also can occur in the example of FIG. 1*a* and FIG. 6. By knowing the hand in the card game in FIG. 1*a*, the hint 600 in FIG. 6 can be determined by the processor (i.e., look up in a table) as to what response from the player is required to increase the expected value for the player in that hand. For example, in a strategy-based game, when the random hint step 330 occurs at the random statistical frequency 340, the present displayed strategy game is evaluated by processor 20 to determine dynamically what response should be provided in the "hint" to increase the player's instantaneous EV.

In general, the casino game whether it is a gaming machine 10 of FIG. 1 or a casino bonus game 100*b* of FIG. 2 has a decision-making game round displayed to a player for the player to respond to. The displayed game round can be any decision-making casino game round under the teachings of the present invention to which a player can respond to. The hint corresponding to the displayed decision-making game round when displayed to the player and when followed by the player increases the player's odds in winning the game round.

The method of the present invention can be summarized in the following. In one embodiment, the decision-making game rounds 700 are stored in memory 60, 130 of the casino game 10,100, each of the stored decision-making game rounds 700 has at least one stored hint 740. The examples of FIGS. 4 and 6 show one stored hint 740, but variations of the present invention can have more than one stored hint for each game round. The stored hint 140 contains response information 410, 610 that if followed enables a player to increase the player's odds in winning the game round. The processor 60 (alone or in combination with display processor 120) randomly selects from a database 790 in memory 60 (or in display memory 130) one game round 700 from the plurality of stored game rounds. The processor 60 (alone or in combination with display processor 120) displays the selected game round (i.e., 90 in FIG. 1 or 310, 320 in FIG. 4) in the display (i.e., 70*a* in FIG. 1 or 110 in FIG. 2) to the player. The processor 60 receives in the input device an input from the player from among possible inputs. The input device could be a separate input device 80 or a touch screen 70*a* in FIG. 1. The processor 60 (or in combination with a display processor 120) displays in the display 70*a*, 110 the hint 200 for the selected game round, in one embodiment, only at a random statistical frequency. In another embodiment, the displaying of the hint 200 occurs before receiving an input from the player in the input device and after a predetermined time has expired.

Figure 8:
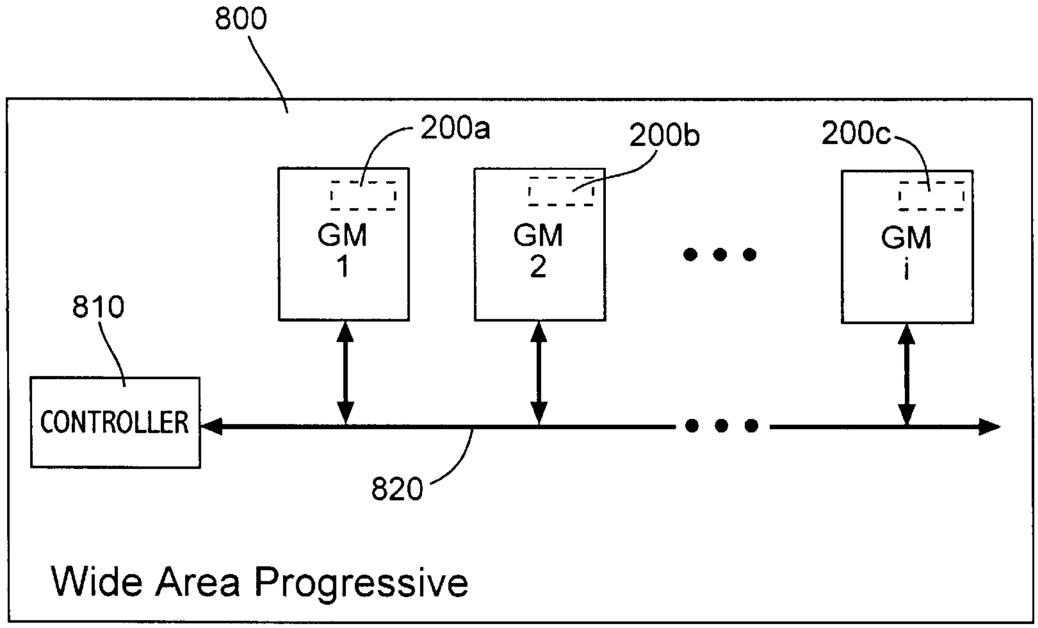
FIG. 8 sets forth the use of the random hint of the present invention in a wide area progressive network.

3. Wide Area Progressive. The hint feature 200 can also be used in a wide area progressive. For example, in one variation of the present invention, the hint feature 200 is used during play of the casino gaming machines interconnected into a wide area progressive 800 as shown in FIG. 8. In such wide area progressive systems 800, a central controller 810 is used to control the wide area progressive. The method of the present invention can be implemented into the central controller 810 to display a hint in a casino gaming machine in a plurality of casino gaming machines GM all interconnected over a bus 820 in a wide area progressive 800. As shown in FIG. 1, a port 140 interfaces the processor 20 to the bus 820.

It is to be expressly understood that there is a variety of wide area progressive system configurations 800 and that such system configurations can be adapted to include an island of gaming machines, gaming machines spread across a casino, gaming machines interconnected together amongst a variety of casinos or a progressive system connected over a network or over the Internet. Again, the topological configuration of a wide area progressive system 800 does not affect the teachings of the hint feature 200 of the present invention.

4. Internet. In another variation of the present invention, the casino gaming machine is a player's own personal computer PC interconnected to a central computer 900 over the Internet 910. It is immaterial whether the casino game is being played in the software in the player's personal computer PC or whether the player's personal computer PC operates as an input/output device for the casino game being operated by software in the central computer 900.

Figure 9:
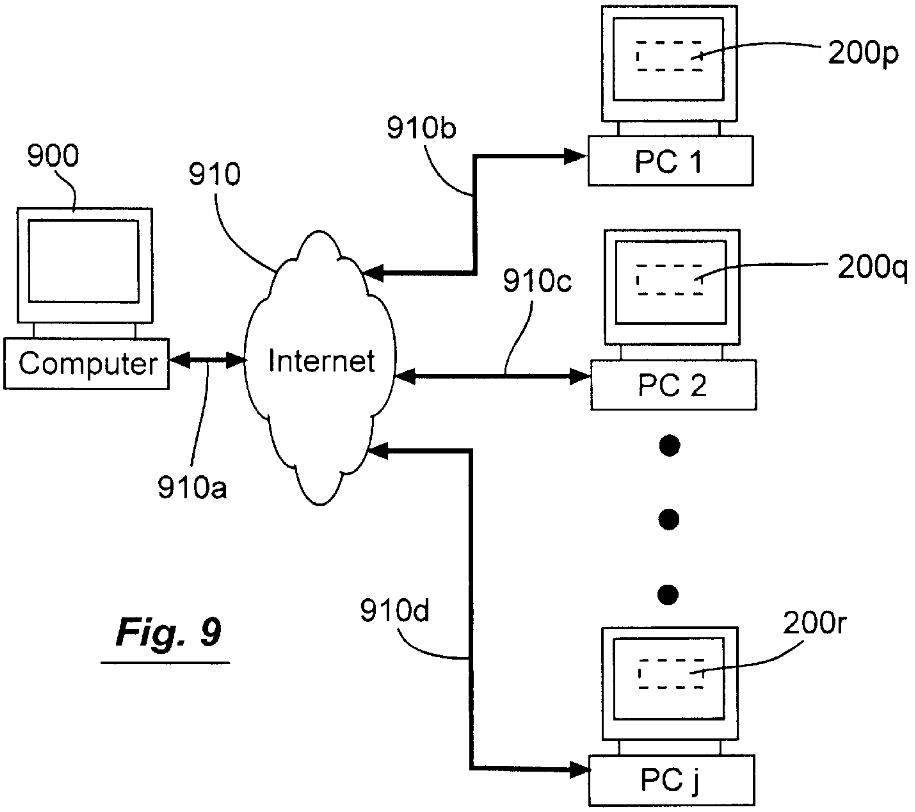
FIG. 9 sets forth the use of the random hint feature of the present invention in gaming played over the Internet.

In FIG. 9, the computer 900 is located at a remote location and communicates 910*a* over the Internet 910 to a plurality of personal computers PC 1-PC j. The communication links 910 are conventional and use of the Internet 910 to establish such communication links is well known and not material to the present invention. In the same fashion, as discussed above for the wide area progressive 800, the computer 900 randomly causes a random hint feature 200 to appear on a personal computer PC while a player is playing a casino game. Again, if the player correctly responds to this random display, the player receives an award and, if incorrectly responds, the game continues.

The above disclosure sets forth a number of embodiments of the present invention. Those skilled in this art will however appreciate that other arrangements or embodiments, not precisely set forth, could be practiced under the teachings of the present invention. For example, the displaying the hint can occur before, with, or after the receipt of the players input. The scope of this invention should only be limited by the scope of the following claims.

I claim:

1. A method of operating a casino game comprising:

displaying in the casino game decision-making game rounds, each of the decision-making game rounds having a plurality of possible player inputs, receiving at least one input of the plurality of possible player inputs to play each displayed decision-making game round, each displayed decision-making game round having a player's expected value that is a function of the received at least one input; the casino game having a players' expected return over all play determined by guessing at the possible player inputs for each decision-making game round, displaying, before receiving the at least one input, at least one hint for randomly selected ones of the displayed decision-making game rounds, each displayed hint providing information concerning at least one of the plurality of possible player inputs for its randomly selected decision-making round, the randomly displayed at least one hints increasing the players' expected return over all play for players following the provided information.

2. The method of claim 1 wherein the casino game is a knowledge-based casino game.

3. The method of claim 2 wherein each decision-making game round is a question and the plurality of possible player inputs are a corresponding plurality of possible answers.

4. The method of claim 3 wherein the displayed at least one hint provides information to the player as to the correct answer or answers in the plurality of answers.

5. The method of claim 1 wherein the at least one displayed hint eliminates one input of the plurality of possible inputs as being incorrect.

6. The method of claim 1 wherein the at least one randomly displayed hint provides information that gives a percentage odds that some of the inputs of the plurality of possible inputs are more correct.

7. The method of claim 1 wherein each decision-making game round is a card hand.

8. The method of claim 7 wherein the displayed at least one hint provides information to the player as to how to play the hand to win.

9. The method of claim 1 wherein the randomly selected ones occur at a random statistical frequency.

10. The method of claim 1 wherein the displayed at least one hint occurs when a prevailing position in the displayed decision-making game round exists.

11. The method of claim 7 wherein the displayed at least one hint occurs when a set time frame expires before receipt of the input.

12. The method of claim 1 wherein the at least one displayed hint is stored in memory with the decision-making game round.

13. The method of claim 1 wherein the at least one displayed hint is dynamically determined from the decision-making round.

14. The method of claim 1 wherein the casino game is a casino bonus game.

15. The method of claim 1 wherein the casino game is in a wide area progressive.

16. The method of claim 1 wherein the casino game is played over the Internet.

17. A method of operating a casino game with at least one player input, the casino game having a players' expected return over all play based upon the player guessing at the at least one player input comprising:

randomly in the casino game at least one hint, said displayed at least one hint providing information concerning at least one of a plurality of possible player inputs, receiving at least one player input in the casino game from the plurality of possible player inputs, the outcome of said received at least one player input affecting the instantaneous value the player receives for the aforesaid displayed game round;

the randomly displayed at least one hint increasing the players' expected return over all play of the game for players following the provided information.

18. The method of claim 17 wherein the displayed at least one hint occurs randomly.

19. The method of claim 17 wherein the displayed at least one hint occurs when a predetermined condition is obtained.

20. The method of claim 19 wherein the predetermined condition is when a prevailing position in the corresponding decision-making game round exists.

21. The method of claim 17 wherein the displayed at least one hint occurs when a set time frame expires before receipt of the at least one player input.

22. The method of claim 17 further comprising preventing display of the at least one hint when the at least one player input is received.

23. The method of claim 17 wherein the at least one hint is dynamically determined from the corresponding decision-making game round.

24. The method of claim 17 wherein the at least one hint is statically stored with the corresponding decision-making game round.

25. The method of claim 17 wherein the event is the at least one received input being wrong and the information displaying that the received input was wrong and further comprising receiving at least one more player input.

26. The method of claim 17 wherein the at least one displayed hint comprises:

displaying a plurality of hint choices, each hint choice containing at least one hint, receiving player input selecting one of the hint choices, displaying the at least one hint for the selected hint choice.

27. A method of operating a casino bonus game comprising:

displaying in the casino bonus game a game round to a player;

randomly displaying in the casino bonus game at least one hint to the player, receiving at least one input from a plurality of possible inputs in the casino bonus game from the player in the displayed game round, said received at least one input affecting the instantaneous value the player receives for the displayed game round;

said displayed at least one hint containing information as to which of the possible inputs increase the expected value to the player.

28. The method of claim 27 wherein the game round is a decision-making game round.

29. The method of claim 28 wherein the casino bonus game is a knowledge-based casino bonus game.

30. The method of claim 29 wherein the randomly displayed at least one hint provides a correct answer for the decision-making game round.

31. The method of claim 29 wherein the randomly displayed at least one hint eliminates an incorrect answer in the decision-making game round.

32. The method of claim 29 wherein the randomly displayed at least one hint provides information that some of the inputs in the plurality of possible inputs are more correct.

* * * * *

UNITED STATES PATENT AND TRADEMARK OFFICE

CERTIFICATE OF CORRECTION

PATENT NO. : 6,666,765 B2
DATED : December 23, 2003
INVENTOR(S) : Olaf Vancura

It is certified that error appears in the above-identified patent and that said Letters Patent is hereby corrected as shown below:

Column 13,
Line 43, after "randomly" insert -- displaying --.

Signed and Sealed this

Thirteenth Day of June, 2006

JON W. DUDAS
*Director of the United States Patent and Trademark Office*

UNITED STATES PATENT AND TRADEMARK OFFICE

CERTIFICATE OF CORRECTION

PATENT NO. : 6,666,765 B2
APPLICATION NO. : 10/057243
DATED : December 23, 2003
INVENTOR(S) : Olaf Vancura It is certified that error appears in the above-identified patent and that said Letters Patent is hereby corrected as shown below:

Column 12, claim 1, line 63, "hints" should be changed to -- hint --

Signed and Sealed this

Twelfth Day of June, 2007

JON W. DUDAS
*Director of the United States Patent and Trademark Office*